(12) United States Patent
Tice

(10) Patent No.: US 6,317,158 B1
(45) Date of Patent: Nov. 13, 2001

(54) METHOD AND APPARATUS FOR POSITIONING AN INPUT IMAGE INTO INTERLACED VIDEO

(75) Inventor: Raymond H. Tice, Billerica, MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/177,830

(22) Filed: Oct. 23, 1998

(51) Int. Cl.$^7$ ........................................ H04N 7/01
(52) U.S. Cl. ........................ 348/447; 348/607; 382/299
(58) Field of Search .................. 348/447, 607, 348/618, 619, 584, 571, 563, 564, 441, 910, 598, 599, 600, 589; 382/264, 275, 299

(56) References Cited

U.S. PATENT DOCUMENTS

| | | | |
|---|---|---|---|
| 4,603,350 | 7/1986 | Arbeiter et al. | 358/140 |
| 5,097,257 | 3/1992 | Clough et al. | 340/814 |
| 5,257,102 | * 10/1993 | Wilkinson | 348/441 |
| 5,280,351 | * 1/1994 | Wilkinson | 348/447 |
| 5,291,280 | * 3/1994 | Faroudja et al. | 348/447 |
| 5,892,551 | * 4/1999 | Uematsu | 348/447 |
| 6,069,984 | * 5/2000 | Sadler et al. | 382/275 |
| 6,094,511 | * 7/2000 | Metcalfe et al. | 382/264 |

FOREIGN PATENT DOCUMENTS

| | | |
|---|---|---|
| 0 610 701A1 | 8/1994 | (EP) . |
| 0 790 737A1 | 8/1997 | (EP) . |

OTHER PUBLICATIONS

Wolberg, G., "Digital Image Warping", IEEE Computer Society Press, Los Alamitos, CA, 1990, Chapter 5, Image Resampling, pp. 117–161.
Poynton, C.A., "A Technical Introduction to Digital Video", John Wiley & Sons, Inc., 1996, pp. 11–13 and 43–79.
Abstract, "Advantages and Drawbacks of Interlaced and Progressive Scanning Formats", Jun. 1995, p. 1 of 1.
Wilt, A., "Technical Difficulties—Fields and Frames", DV.com. Magazine, Dec. 2000, pp. 1–6.
Guillotel P. et al, "Progressive versus Interlaced Coding", 6 pages, date unknown.
Abstracts, SPIE Proceedings vol. 2315b, Dec. 2000, pp. 1–23.

* cited by examiner

Primary Examiner—Reinhard J. Eisenzopf
Assistant Examiner—Trang U. Tran
(74) Attorney, Agent, or Firm—Peter J. Gordon

(57) ABSTRACT

When processing a time varying effect that positions an input image into an interlaced output image, the input image is filtered first. The filtered input image then is positioned in the output image by mapping one line in the output image to one line in the input image space. The input image may be filtered once and the filtered image may be used to create all output fields for the effect. Thus, the overhead per output field used to create the output field from the input image is reduced in comparison to filtered subpixel positioning. In addition, equipment that is capable of performing only unfiltered subpixel positioning may use the filtered input image to reduce interlaced artifacts.

37 Claims, 6 Drawing Sheets

METHOD AND APPARATUS FOR POSITIONING AN INPUT IMAGE INTO INTERLACED VIDEO

BACKGROUND

An interlaced video signal is a common format for video information. In an interlaced video signal, each image or frame is defined by a set of lines of pixels. These lines are separated into two fields such that adjacent lines in the image or frame are in separate fields. Odd lines define an odd field; even lines define an even field. In an interlaced video display, only one field of each image is displayed each time the display is refreshed, alternating between odd and even fields within each image. Because the two fields usually closely resemble each other, and because the fields are displayed at twice the frame rate, a human eye generally does not perceive that each field actually is refreshed at the frame rate and thus does not perceive flickering.

Although an interlaced video signal generally provides good quality images and sufficient bandwidth, various artifacts may occur when a time varying effect is added to the interlaced video, particularly if the effect involves positioning an image, such as a progressive scan image, into the interlaced video. An input image may be positioned into the interlaced video signal by selecting, for each line in the output image, a corresponding line in the input image and a fraction indicating a subpixel position (or offset) into that line and the next (or previous) line in the input image. The intensity, color and brightness of each pixel in the output line is determined as a function of the subpixel position and the corresponding pixels in the selected lines in the input image. Thus, two lines in two different fields in the input image typically contribute to each line in an output field. This technique may be called "unfiltered subpixel positioning." With unfiltered subpixel positioning, various artifacts may occur. Such artifacts include detail areas that appear to flicker (called twitter), such as with credits or other small text, or detail areas that appear and disappear over time.

The artifacts caused by unfiltered subpixel positioning may be reduced by positioning the input image into the interlaced video by determining the intensity, color and brightness of each pixel in the output line as a function of the subpixel position and the corresponding pixels in the corresponding line in one field of the input image and both of the adjacent lines in the other field of the input image. Thus, three lines in two different fields in the input image typically contribute to each line in an output field. This technique may be called "filtered subpixel positioning," and has at least two disadvantages. First, the input image becomes slightly blurred. Second, each output line requires additional processing and storage, in comparison to unfiltered subpixel positioning, due to the use of three input lines.

SUMMARY

When processing a time varying effect that positions an input image into an interlaced output image, the input image is filtered first. The filtered input image then is positioned in the output image by mapping one line in the output image to one line in the filtered input image space. The input image may be filtered once and the filtered input image may be used to create all output fields for the effect. Thus, the overhead per output field used to create the output field from the input image is reduced in comparison to filtered subpixel positioning. In addition, equipment that is capable of performing only unfiltered subpixel positioning may use the filtered input image to reduce interlaced artifacts.

Accordingly, in one aspect, a process generates an interlaced video output frame comprising two fields from an input image according to an effect. In this process, the input image is filtered. A subpixel position in the filtered input field is determined for each output field according to the effect. The filtered input image is positioned in each output field according to the determined subpixel position. In one embodiment, the filtered input image is stored. The stored filtered input image is then positioned in the output field. In another embodiment, the subpixel position is a vertical position of each line of the filtered input image in the output image. Each pixel value in a line of the output field is computed according to a function of pixel values in two adjacent lines in the stored filtered input image and the vertical position.

In another aspect, a process generates a sequence of interlaced video output frames, wherein each output frame comprises two fields, from an input image according to an effect which varies over time. The input image is filtered and stored. For each field of each output frame, a subpixel position in the stored filtered input field is determined according to the effect, a position of the field in the output frame and a position of the output frame in the sequence. The stored filtered input image is positioned in the field of the output frame according to the determined subpixel position.

In yet another aspect, a process generates a sequence of interlaced video output frames, wherein each output frame comprises two fields, from an input image according to an effect which varies over time. For each field of each output frame, the input image is filtered. A subpixel position in the filtered input image is determined according to the effect, a position of the field in the output frame and a position of the output frame in the sequence. The filtered input image is positioned in the field according to the determined subpixel position.

In other embodiments of these aspects, the filtering may be achieved by averaging adjacent lines in the input image. Alternatively, filtering may be achieved by applying a low pass filter to the input image. Filtering also may involve applying a nonlinear filter to the input image. The image generally is filtered vertically but also may be filtered horizontally.

In other embodiments, the subpixel position may be determined by computing a vertical position of each line of the filtered input image in the output image according to the effect. In this embodiment, each pixel value in a line of the output field is computed according to a function of pixel values in two adjacent lines in the filtered input image and the computed vertical position.

In other embodiments, the filtering applied to the input image has an associated offset. The subpixel position is adjusted according to the offset. The filtered input image is positioned in each output field according to the adjusted subpixel position.

Another aspect is an editing system or other apparatus that performs such a process. The editing system also may include an effects processing system and a display. Another aspect is a computer program product in which computer program code is stored on a computer readable medium, wherein the computer program code. when executed, performs such a process. The process also may be performed by a combination of computer program code executed on a general purpose computer and one or more peripheral devices of the computer. Another aspect is a file format either for a video program including such an effect or for the effect, wherein the effect, the filtered image and any offset caused by the filtering are stored.

DETAILED DESCRIPTION

The following detailed description should be read in conjunction with the attached drawing in which similar reference numbers indicate similar structures. All references cited herein are hereby expressly incorporated by reference.

Figure 1:
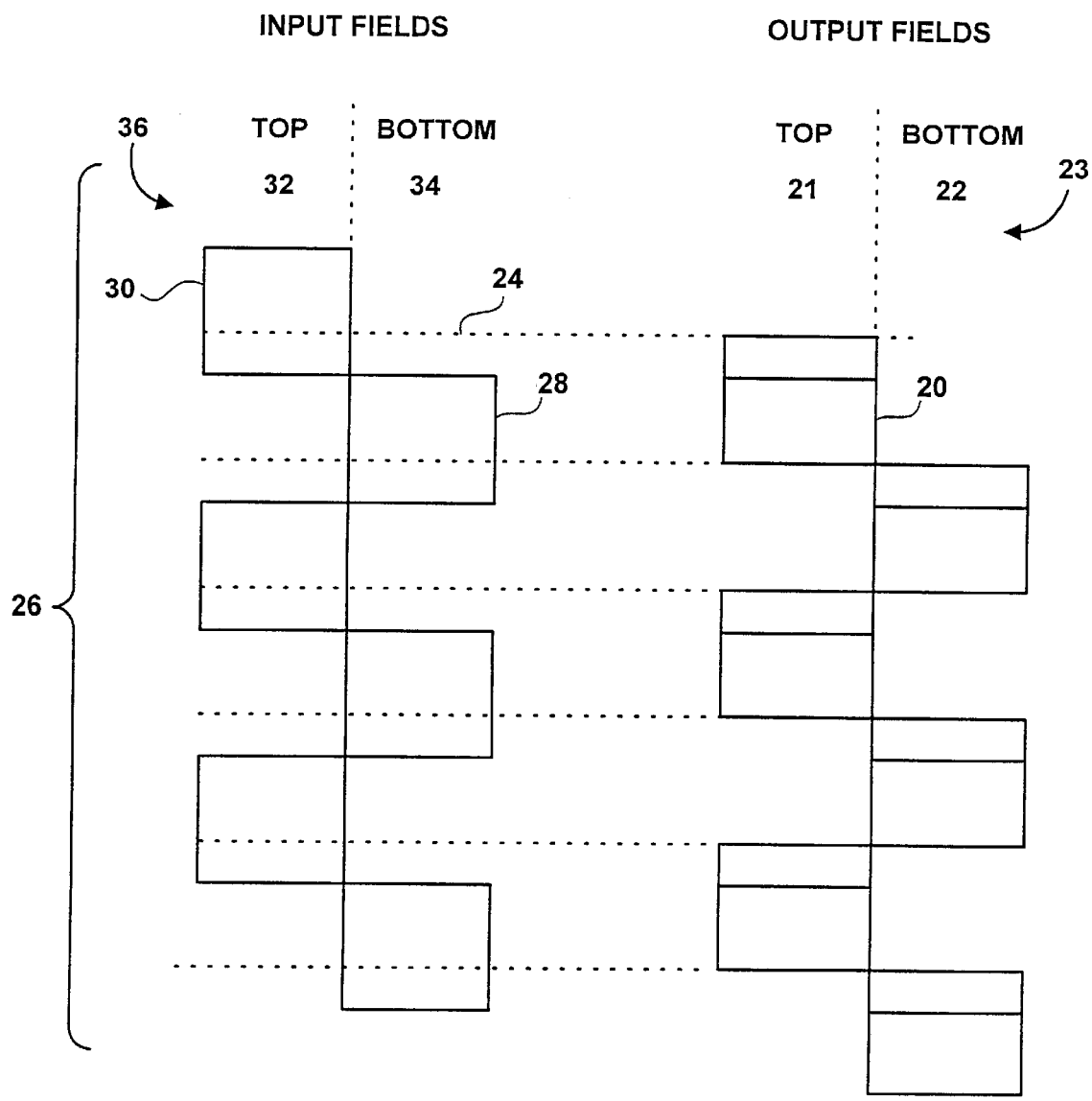
FIG. 1 is a schematic diagram illustrating how an output field is generated from an input field using conventional unfiltered subpixel positioning.

Referring now to FIG. 1, unfiltered subpixel positioning will now be described. This technique vertically positions an image, such as a title or other character information, matte, raster scan image or other static information, into an interlaced video field according to an effect. In particular, each line 20 in each field 21 and 22 the output image 23 is mapped, according to the effect, to one line in the input image space 26, as indicated by dashed lines 24. The mapping provides an integer, indicating a line in the input image from which a pixel is selected, and a fraction, indicating a subpixel position or offset into that line and the next (or previous) line. Thus, two lines (e.g., 28 and 30) in two different fields 32 and 34 in the input image 36 typically contribute to each line (e.g., 20) in an output field (e.g., 21). The intensity, color and brightness of each pixel ($P_{out}$) in the output line is determined as a function of the subpixel position (SubPixelPosition) and two pixels ($P_{in0}$ and $P_{in1}$) in the selected lines in the input image. For example, $$P_{out}=P_{in1}*\text{SubPixelPosition}+P_{in0}*(1-\text{SubPixelPosition}). \quad \text{Eq. 1a}$$

This formula is commonly implemented in computer and video equipment in a slightly altered form as shown in Equation 1b:

$$P_{out}=(P_{in1}-P_{in0})*\text{SubPixelPosition}+P_{in0}. \quad \text{Eq. 1b}$$

Figure 2:
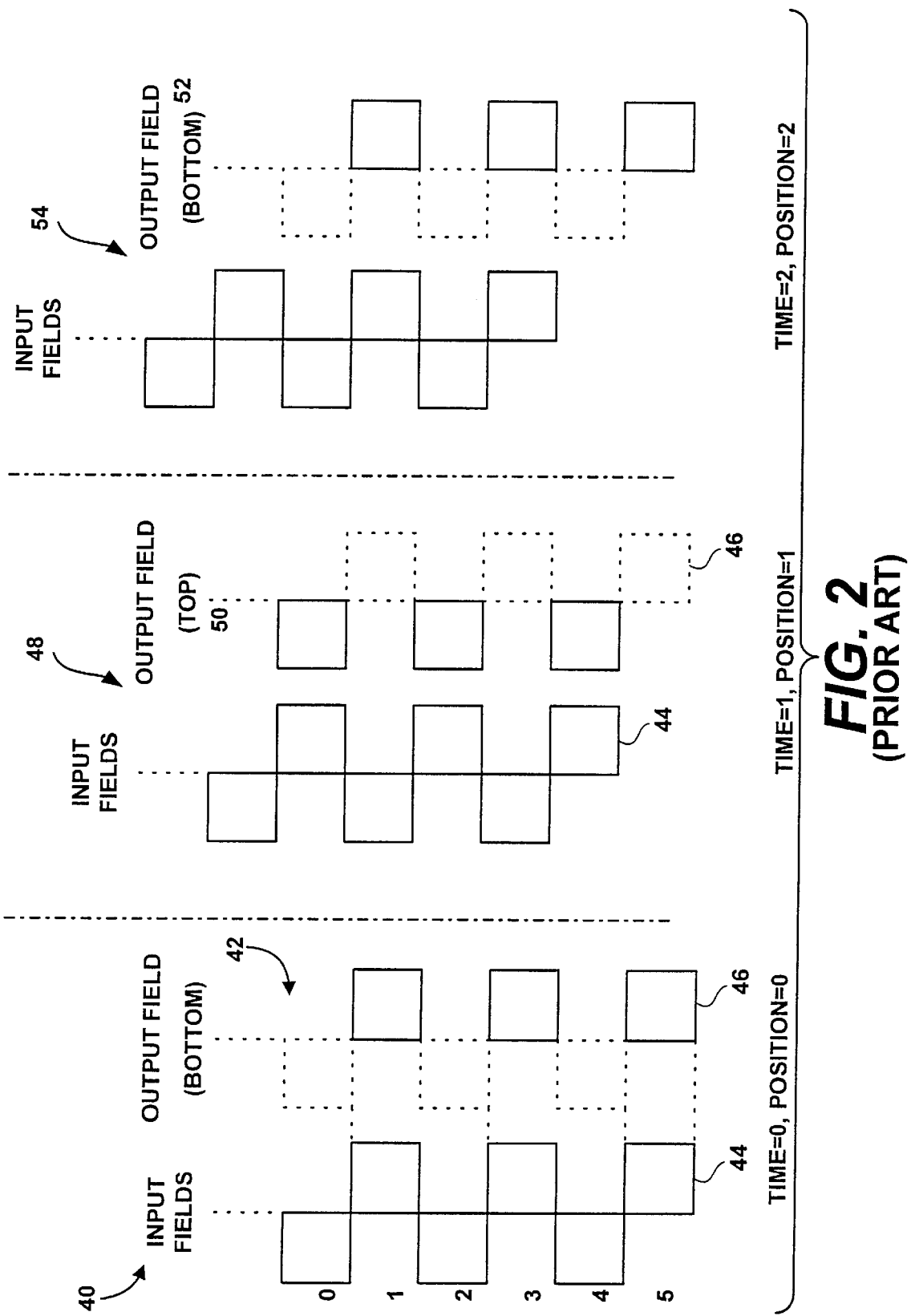
FIG. 2 is a schematic diagram illustrating problems associated with conventional unfiltered subpixel positioning.

Referring now to FIG. 2, time varying distortion is one kind of problem that may occur using unfiltered subpixel positioning described in connection with FIG. 1 and equations 1a and 1b. Such a distortion causes noticeable artifacts when a time varying effect specifies that the input image is moved vertically in the output image in successive fields, such as in a rolling title or matte. In particular, if the rate of the vertical movement (called a roll rate) is close to an integral number of lines per field, both input fields will not be represented equally in the output fields of all field pairs. An extreme case is when the roll rate is exactly one line per field, with a starting offset of zero lines from the bottom output fields, which is shown in FIG. 2. In this case, for the first (bottom) output field 42, the offset between input lines (e.g., 44) and output lines (e.g. 46) is 0.0. Thus, lines labeled 1, 3, 5, . . . , of the input image are used, as shown at 40 in FIG. 1. For the second (top) output field 50, the input image has rolled up by one line. The relative offset between input line (e.g. 44) and output line (e.g. 46) is 1.0. Thus, the nearest lines of the input image, lines 1, 3, 5, . . . , of the input image, are again used, as shown at 48 in FIG. 1. Similarly, for the third output field 52, lines 3, 5, . . . , are used, as shown at 54 in FIG. 1 This pattern continues with the remainder of the fields in the interlaced video. As shown by this example, image data is discarded and image quality suffers. More distracting artifacts can appear when the roll rate is not an integral number of lines per field. With such a roll rate, detail from each field can appear and disappear in the video over time.

Another problem that may occur using unfiltered subpixel positioning is called "twitter." Twitter occurs where two input fields are dissimilar enough for the eye to perceive the update rate of the fields. Such dissimilarity among fields typically occurs in detail areas, such as with small text or graphics having sharp edges or narrow lines, which commonly are in credits provided at the end of a video. Such detail areas appear to flicker.

A conventional technique for avoiding these problems associated with unfiltered subpixel positioning involves mapping each line of the output field to two lines in the input image, thus using three lines in the input image to produce a line in the output field. In other words, portions of both adjacent input lines always are used when calculating each output line. This method, called filtered subpixel positioning, is illustrated in connection with FIG. 3.

In this diagram only one output field 60 is shown. The other output field is produced in a similar manner. Each line, e.g. 62, in the output field is mapped to two lines, as noted at 64, in the input image space 66. In effect, a two line window of the source image is used to produce the output line. Thus, two or more lines (and usually 3), e.g., 68, 70 and 72, always are used to produce a line in the output field. In particular, the top line contributes:

$$P_{in0}*(1-\text{SubPixelPosition}).$$

The middle line is entirely included to contribute:

$$P_{in1}*1.$$

A portion of the bottom line contributes:

$$P_{in2}*\text{SubPixelPosition}.$$

Each pixel in the output line is the sum of these three components, scaled by a factor of two. The overall equation is:

$$P_{out}=(P_{in0}*(1-\text{SubPixelPosition})+P_{in1}+P_{in2}\text{SubPixelPosition})/2. \quad (2)$$

Figure 3:
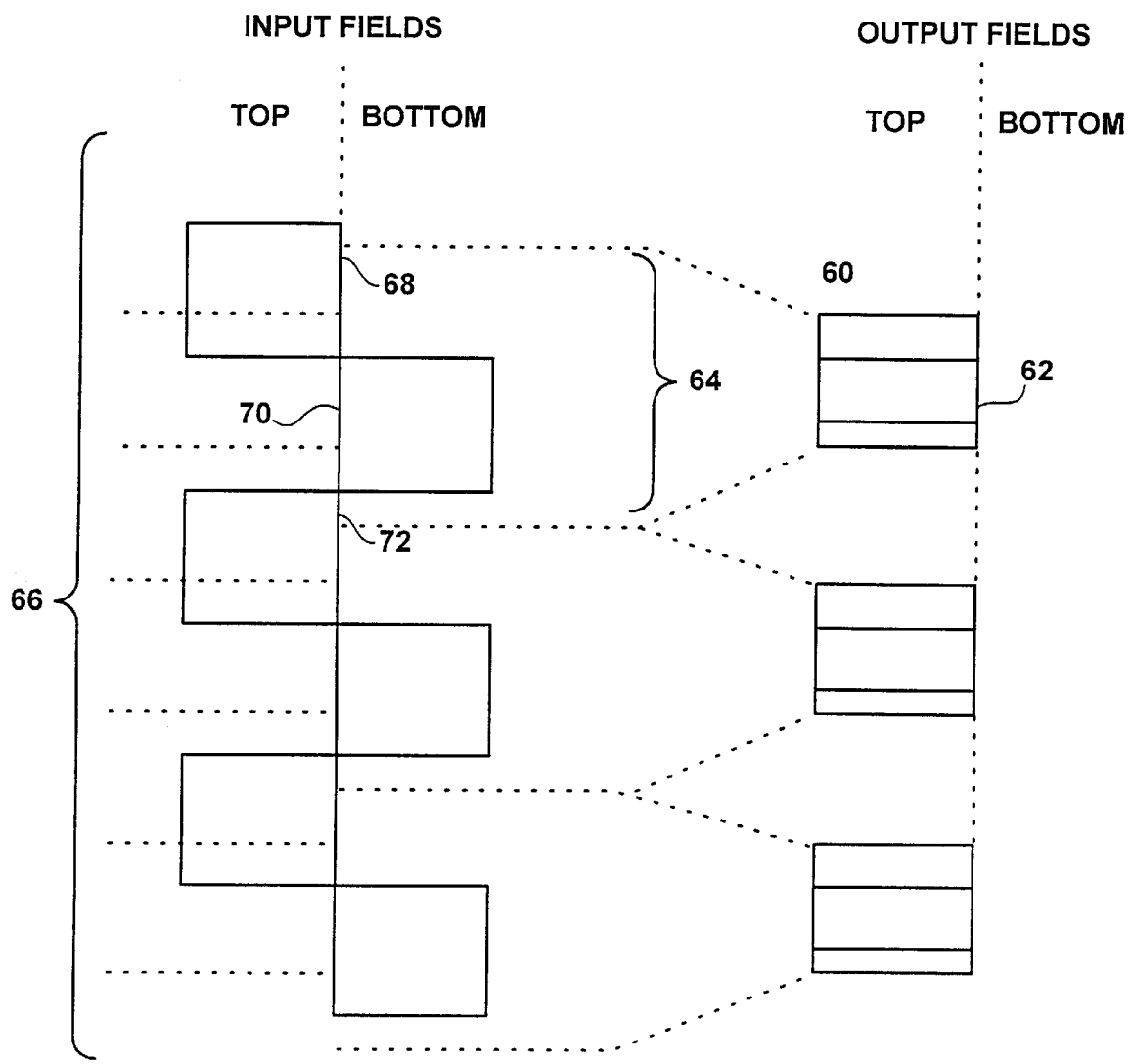
FIG. 3 is a schematic diagram illustrating conventional filtered subpixel positioning using a two line window in the input image to generate an output pixel.

Using filtered subpixel positioning as described in connection with FIG. 3 and Equation 2, additional processing and storage is required in comparison to unfiltered subpixel positioning. Another problem is that some equipment can perform only unfiltered subpixel positioning and cannot use this technique.

These problems are overcome by using unfiltered subpixel positioning on a filtered input image. The image may be filtered once, and the filtered image may be used to create all output fields for the effect. Thus, the overhead to create each output field from the filtered input image is reduced in comparison to filtered subpixel positioning. In addition, whether or not the filtered input image is stored equipment that is capable of performing only unfiltered subpixel positioning may use a filtered input image to reduce interlace artifacts.

Figure 4:
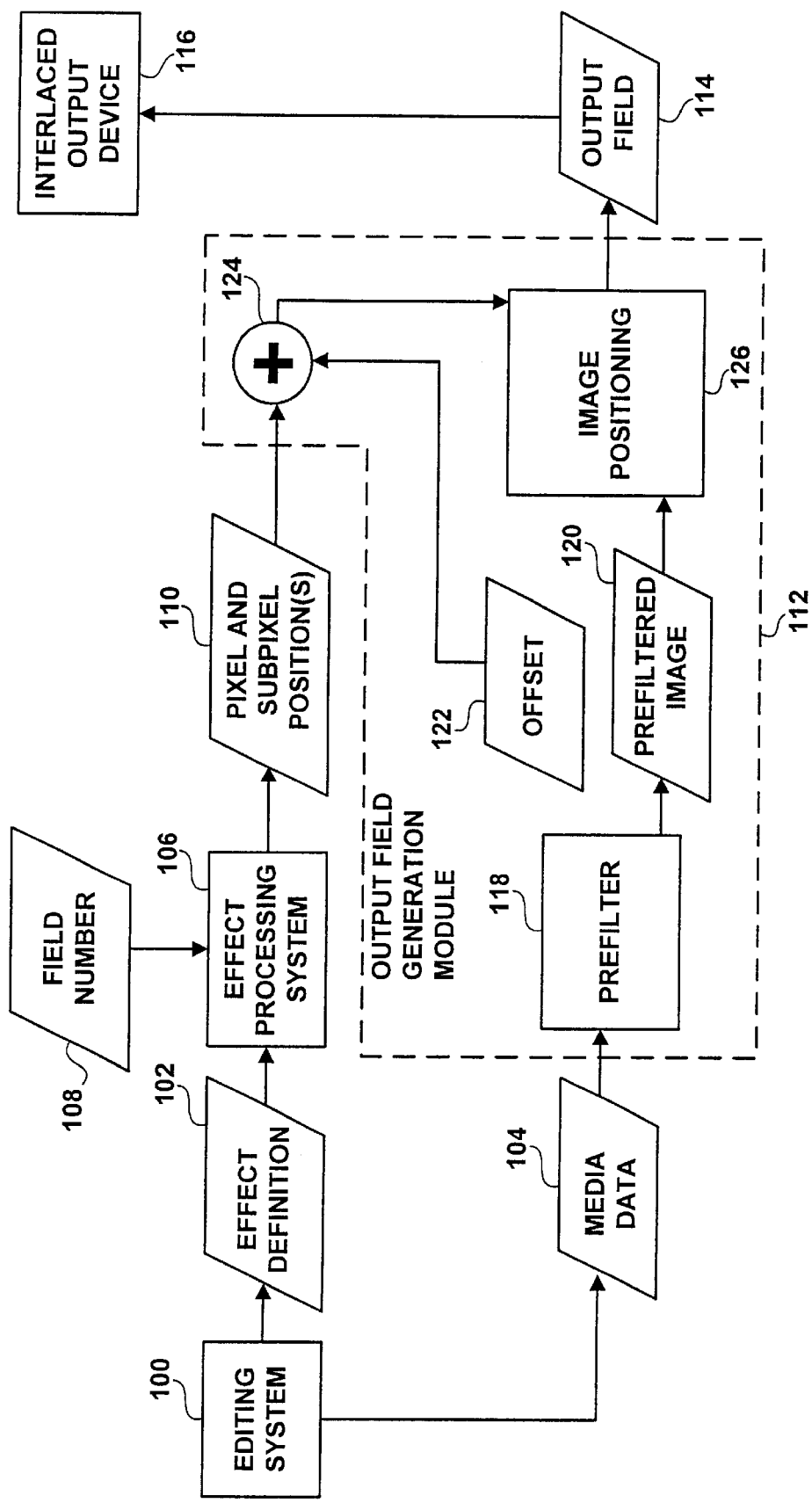
FIG. 4 is a data flow diagram illustrating one embodiment of using prefiltering of the input image and unfiltered subpixel positioning in the output field.

FIG. 4 is a data flow diagram illustrating generally one embodiment of an editing system using such filtering of the input image. In general, an editing system 100 permits an editor to define an effect 102 that is associated with some media data 104, such as a progressive scan image, raster scan image, matte, title, or other graphical or character information. The effect definition 102 defines how the media data 104 varies over time in a vertical direction within the output fields. The effect definition also may define a spatial mapping of the media data into an output field, such as horizontal and vertical position, horizontal and vertical scaling and any rotation. One such effect is a roll for a title, which is commonly used for credits at the end of a movie.

An effect processing system 106 determines, for each field 108 in a sequence of output fields, the pixel and subpixel positions 110 that are used to map an input field into an output field. An output field generation module 112 produces an output field 114 based on the pixel and subpixel positions 110 and the media data 104. The output field then may be provided to an interlaced output 116 for transmission or display. The output field also may be stored for later transmission or editing.

The output field generation module 112 prefilters the media data 104 using a prefilter 118 which provides a prefiltered image 120. This prefiltered image may be stored and used for each output field throughout the duration of the effect defined by the effect definition 102. The prefiltering performed by prefilter 118 thus may be performed for only once for the effect and not for each output field. Alternatively, the image may be prefiltered for each output filtered to avoid storage of the prefiltered image 120.

The prefilter 118 generally has an associated offset 122. This value is generally a constant that may be derived from the function performed by the prefilter and thus may be stored in memory. This offset is generally independent of the media data 104 being filtered. Offset 122 represents a vertical displacement of the prefiltered image 120 with respect to the original media data 104. This offset 122 is added by adder 124 to the pixel and subpixel positions 110 to adjust the subpixel position prior to positioning of the prefiltered image 120 in the output field.

The prefiltered image 120 is positioned in the output field by an image positioning 126 that uses unfiltered subpixel positioning based on the output of adder 124, i.e., the subpixel position (adjusted if there is any offset associated with the filtering). The output of the image positioning 126 is the desired output field 114. The image positioning performed by module 126 is described by equations 1a and 1b above.

An editing system such as shown in FIG. 4 may be implemented as a computer program using a general purpose computer system and associated video processing equipment. Such a computer system typically includes a main unit connected to both an output device which displays information to a user and an input device which receives input from a user. The main unit generally includes a processor connected to a memory system via an interconnection mechanism. The input device and output device also are connected to the processor and memory system via the interconnection mechanism.

It should be understood that one or more output devices may be connected to the computer system. Example output devices include a cathode ray tube (CRT) display, liquid crystal displays (LCD) and other video output devices, printers, communication devices such as a modem, storage devices such as disk or tape, and audio output. It should also be understood that one or more input devices may be connected to the computer system. Example input devices include a keyboard, keypad, track ball, mouse, pen and tablet, communication device, and data input devices such as audio and video capture devices and sensors. It should be understood the invention is not limited to the particular input or output devices used in combination with the computer system or to those described herein.

The computer system may be a general purpose computer system which is programmable using a computer programming language, such as "C++," JAVA or other language, such as a scripting language or even assembly language. The computer system may also be specially programmed, special purpose hardware. In a general purpose computer system, the processor is typically a commercially available processor, such as the series x86 and Pentium processors, available from Intel, similar devices from AMD and Cyrix, the 680X0 series microprocessors available from Motorola, and the PowerPC microprocessor from IBM. Many other processors are available. Such a microprocessor executes a program called an operating system, of which WindowsNT, Windows95 or 98, UNIX, Linux, DOS, VMS, MacOS and OS8 are examples, which controls the execution of other computer programs and provides scheduling, debugging, input/output control, accounting, compilation, storage assignment, data management and memory management, and communication control and related services. The processor and operating system define a computer platform for which application programs in high-level programming languages are written.

A memory system typically includes a computer readable and writeable nonvolatile recording medium, of which a magnetic disk, a flash memory and tape are examples. The disk may be removable, known as a floppy disk, or permanent, known as a hard drive. A disk has a number of tracks in which signals are stored, typically in binary form, i.e., a form interpreted as a sequence of one and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk when processing is completed. A variety of mechanisms are known for managing data movement between the disk and the integrated circuit memory element, and the invention is not limited thereto. It should also be understood that the invention is not limited to a particular memory system.

Such a system may be implemented in software or hardware or firmware, or a combination of the three. The various elements of the system, either individually or in combination may be implemented as a computer program product tangibly embodied in a machine-readable storage device for execution by a computer processor. Various steps of the process may be performed by a computer processor executing a program tangibly embodied on a computer-readable medium to perform functions by operating on input and generating output. Computer programming languages suitable for implementing such a system include procedural programming languages, object-oriented programming languages, and combinations of the two.

It should be understood that the invention is not limited to a particular computer platform, particular processor, or particular programming language. Additionally, the computer system may be a multiprocessor computer system or may include multiple computers connected over a computer network. It should be understood that each module (e.g. 100, 106, 112, 116, 118, 124 and 126) in FIG. 4 may be separate modules of a computer program, or may be separate computer programs. Such modules may be operable on separate computers. The data (e.g. 102, 104, 108, 110, 114, 120) may be stored in a memory system or transmitted between computer systems.

In one embodiment, the editing system 100 may be implemented using any of a number of commercially available editing systems. Such systems define a video program in a number of ways and typically permit an effect, such as a roll, to be defined and associated with some media data for a sequence of output images or frames. The effect definition may be stored with the associated media data or reference to it, or with the prefiltered image or reference to it and any associated offset. Such systems typically include an effect processing system 106 to provide pixel and subpixel positions in accordance with the defined effect. The interlaced output device 116 is any device which accepts an interlaced video signal, such as a video tape recorder or television.

The prefilter 118 may perform a simple average of adjacent pixels in adjacent lines, such as represented by the formula:

$$P_{temp}=(P_{in0}+P_{in1})/2.$$

With this prefilter, the associated offset 122 is one-half of a line. This example filter effectively uses a filter window of only two lines. A weighted average of the pixels also could be used, which may reduce blurring but increase artifacts. Three or more lines also can be used to create each line in the filtered image, but may cause increased blurring. The prefilter 118 also may be any type of low pass filter. Prefiltering also may be performed according to the gamma curve for a particular display. In some embodiments, the filter may have no associated offset, i.e., the offset is zero. An offset could be avoided by using an odd number of taps for the low pass filter or by using a filter that performs, for example, three element kernel convolution. In any case, the offset 122 is set to the vertical displacement of the filtered image caused by the prefilter with respect to the original media data.

Figure 5:
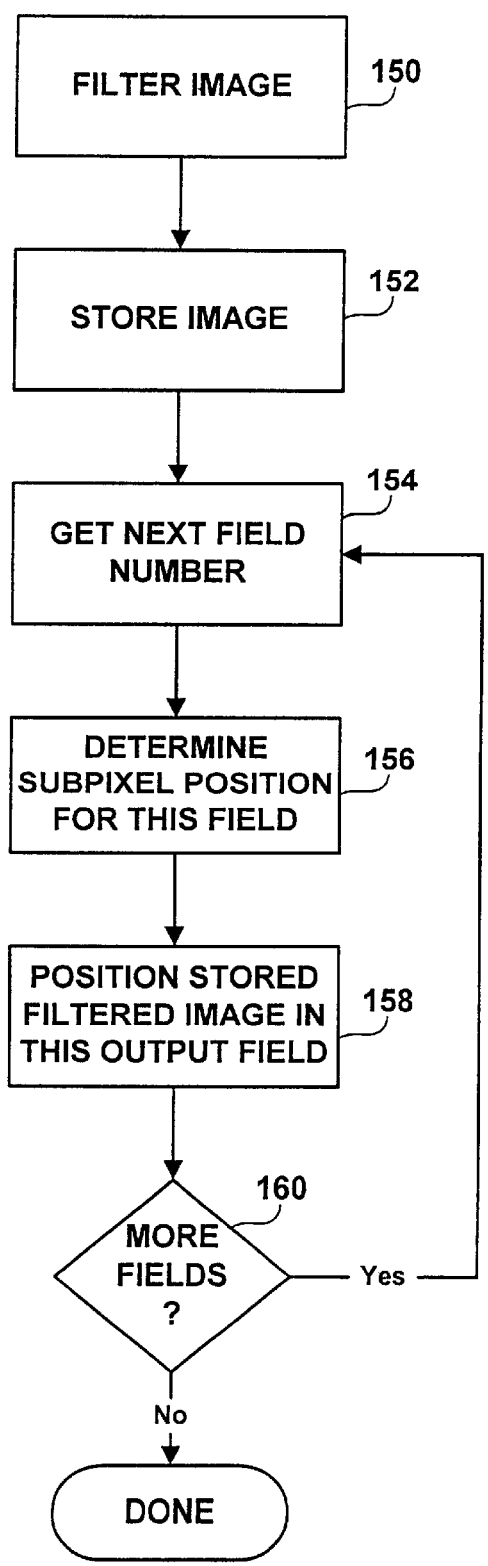
FIG. 5 is a flow chart describing one embodiment in which the filtered input image is stored and used for all output fields.

There are several ways to coordinate the processes of filtering the input image and positioning the filtered input image in the output image. One embodiment will now be described in connection with FIG. 5. In FIG. 5, the media data 104 (FIG. 4) is filtered in step 150 by prefilter 118. The prefiltered image 120 (FIG. 4) is then stored in step 152. The first field of the effect is then obtained in step 154. The subpixel position in the stored filtered input field is determined according to the effect, a position of the field in the output frame and a position of the output frame in the sequence of frames for the effect definition in step 156. The subpixel positions may be precomputed and stored for each field of the effect, and then accessed in step 156, given the field selected in step 154. Alternatively, the subpixel position may be computed in step 156 for the field selected in step 154. The stored filtered input image is positioned in the output field according to the determined subpixel position in step 158. If more output fields need to be produced for the effect, as determined in step 160, processing returns to step 154 to obtain the next output field number. Otherwise, the process of generating the output sequence is complete.

The prefiltered image 120, if stored, may be stored in several different formats. The image may be compressed or uncompressed. The prefiltered image 120 also may be stored as a single frame, or as separate fields.

While in some instances it may be desirable to store the prefiltered image 120, some economical implementations may use prefiltering 118 that is applied to each input image as the output field is being generated. Such an embodiment would avoid using substantial memory to store the prefiltered image by using simple processing circuits to filter the image prior to positioning the image in the output field, and will now be described in connection with FIG. 6.

Figure 6:
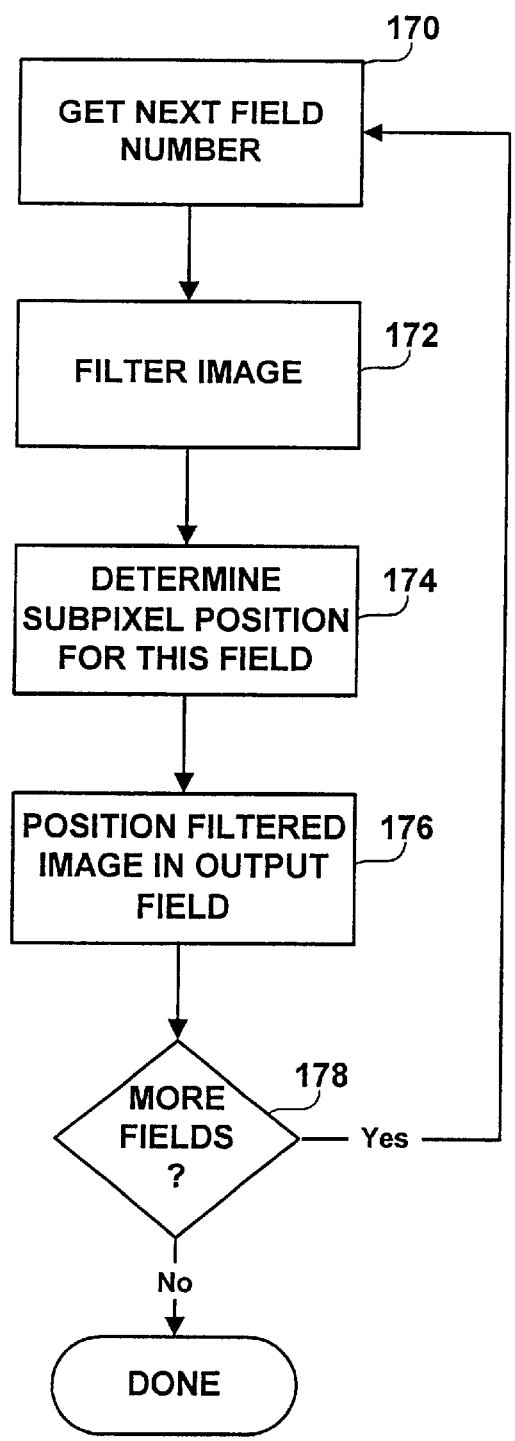
FIG. 6 is a flow chart describing one embodiment in which the input image is filtered for each output field.

In FIG. 6, the first field of the effect is obtained in step 170. The media data 104 (FIG. 4) is filtered in step 172 by prefilter 118. The subpixel position in the filtered input field is determined according to the effect, a position of the field in the output frame and a position of the output frame in the sequence of frames for the effect definition in step 174. The subpixel positions may be precomputed and stored for each field of the effect, and then accessed in step 174, given the field selected in step 170. Alternatively, the subpixel position may be computed in step 174 for the field selected in step 170. The filtered input image is positioned in the output field according to the determined subpixel position in step 176. If more output fields need to be produced for the effect, as determined in step 178, processing returns to step 170 to obtain the next output field number. Otherwise, the process of generating the output sequence is complete.

In embodiments where the image positioning 126 is implemented in hardware and performs only unfiltered subpixel positioning, such hardware may be used to provide a filtered output field 114 by using the prefilter 118. An additional advantage provided by the prefilter 118 is that the total overhead for filtering the image can be reduced because the filtered input image is independent of the subpixel positions derived for it and thus can be used from field to field and from frame to frame. Ultimately, the prefiltering can be done separately from applying the effect definition to the underlying video. The reduction of this overhead may free the entire system to perform other operations, such as additional video effects. For example, the prefilter 118 could be applied to the media data 104 at the time the effect 102 is defined. The prefiltered image 120 and associated offset 122 could be stored together and used at a later time or in different systems that ultimately process the effect 102.

Having now described a few embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A process of modifying a sequence of interlaced video frames, wherein each frame comprises two fields, to include an input image according to an effect that defines at least a position of the input image in each frame, comprising:

filtering the input image;

determining a subpixel position for each field of each frame in the filtered input field according to the effect; and inserting the filtered input image in each field of each frame according to the effect and the determines subpixel position.

2. The process of claim 1, wherein the step of filtering includes the step of averaging adjacent lines in the input image.

3. The process of claim 1, wherein the step of filtering includes the step of applying a low pass filter to the input image.

4. The process of claim 1, wherein the step of filtering includes the step of applying a nonlinear filter to the input image.

5. The process of claim 1, further comprising:
   storing the filtered input images; and
   wherein the step of inserting comprises inserting the stored filtered input image.

6. The process of claim 5, wherein the step of determining comprises the step of computing a vertical position of each line of the stored filtered input image in the field according to the effect; and
   wherein the step of inserting the stored filtered input image into the field comprises the step of computing each pixel value in a line of the field according to a function of pixel values in two adjacent lines in the stored filtered input image and the computed vertical position.

7. The process of claim 1,
   wherein the step of determining comprises the step of computing a vertical position of each line of the filtered input image in the field according to the effect; and
   wherein the step of inserting the filtered input image into the field comprises the step of computing each pixel value in a line of the field according to a function of pixel values in two adjacent lines in the filtered input image and the computed vertical position.

8. The process of claim 1,
   wherein the step of filtering has an associated offset; and
   wherein the step of inserting comprises:
      adjusting the determined subpixel position according to the offset; and
      inserting the filtered input image in each field according to the adjusted subpixel position.

9. A process of modifying a sequence of interlaced video frames, wherein each frame comprises two fields, to include an input image according to an effect that defines at least a position of the input image in each frame, comprising:
   filtering the input image;
   storing the filtered input image;
   for each field of each frame,
      determining a subpixel position in the stored filtered input field according to the effect, a position of the field in the frame and a position of the frame in the sequence; and
      inserting the stored filtered input image in the field according to the effect and the determined subpixel position.

10. The process of claim 9, wherein the step of filtering includes the step of averaging adjacent lines in the input image.

11. The process of claim 9, wherein the step of filtering includes the step of applying a low pass filter to the input image.

12. The process of claim 9, wherein the step of filtering includes the step of applying a nonlinear filter to the input image.

13. The process of claim 9,
   wherein the step of determining comprises the step of computing a vertical position of each line of the filtered input image in the field according to the effect; and
   wherein the step of inserting the filtered input image into the field comprises the step of computing each pixel value in a line of the field according to a function of pixel values in two adjacent lines in the filtered input image and the computed vertical position.

14. The process of claim 9,
   wherein the step of filtering has an associated offset; and
   wherein the step of inserting comprises:
      adjusting the determined subpixel position according to the offset; and
      inserting the filtered input image in each field according to the adjusted subpixel position.

15. A process of generating a sequence of interlaced video frames, wherein each frame comprises two fields, from an input image according to an effect, comprising:
   for each field of each frame,
      filtering the input image;
      determining a subpixel position in the filtered input field according to the effect, a position of the field in the frame and a position of the frame in the sequence; and
      positioning the stored filtered input image in the field according to the determined subpixel position.

16. The process of claim 15, wherein the step of filtering includes the step of averaging adjacent lines in the input image.

17. The process of claim 15, wherein the step of filtering includes the step of applying a low pass filter to the input image.

18. The process of claim 15, wherein the step of filtering includes the step of applying a nonlinear filter to the input image.

19. The process of claim 15,
   wherein the step of determining comprises the step of computing a vertical position of each line of the filtered input image in the field according to the effect; and
   wherein the step of positioning the filtered input image into the field comprises the step of computing each pixel value in a line of the field according to a function of pixel values in two adjacent lines in the filtered input image and the computed vertical position.

20. The process of claim 15,
   wherein the step of filtering has an associated offset; and
   wherein the step of positioning comprises:
      adjusting the determined subpixel position according to the offset; and
      positioning the filtered input image in each field according to the adjusted subpixel position.

21. Apparatus for modifying a sequence of interlaced video frames, wherein each frame comprises two fields, to include an input image according to an effect that defines at least a position of the input image in each frame, comprising:
   a prefilter for filtering the input image;
   an effect processing system for determining a subpixel position for each field of each frame in the filtered input field according to the effect; and
   an image positioning system for inserting the filtered input image in each field of each frame according to the effect and the determined subpixel position.

22. Apparatus as defined in claim 21, wherein said prefilter comprises means for averaging adjacent lines in the input image.

23. Apparatus as defined in claim 21, wherein said prefilter comprises a low pass filter.

24. Apparatus as defined in claim 21, wherein said prefilter comprises a nonlinear filter.

25. Apparatus as defined in claim 21, further comprising:

a memory system for storing the filtered input image; and wherein said image positioning system accesses the filtered input image stored in the memory system.

26. Apparatus as defined in claim 25, wherein said effect processing system comprises means for computing a vertical position of each line of the filtered input image in the field according to the effect; and wherein said image positioning system comprises means for computing each pixel value in a line of the field according to a function of pixel values in two adjacent lines in the stored filtered input image and the computed vertical position.

27. Apparatus as defined in claim 21, wherein said effect processing system comprises means for computing a vertical position of each line of the filtered input image in the field according to the effect; and wherein said image positioning system comprises means for computing each pixel value in a line of the field according to a function of pixel values in two adjacent lines in the filtered input image and the computed vertical position.

28. Apparatus as defined in claim 21, wherein said prefilter has an associated offset; and wherein said image positioning system comprises means for adjusting the determined subpixel position according to the offset; and means for inserting the filtered input image in each field according to the adjusted subpixel position.

29. Apparatus for modifying a sequence of interlaced video frames, wherein each frame comprises two fields, to include an input image according to an effect that defines at least a position of the input image in each frame, comprising:

a prefilter for filtering the input image;

a memory for storing the filtered input image;

an effect processing system for determining, for each field of each frame, a subpixel position in the stored filtered input field according to the effect, a position of the field in the frame and a position of the frame in the sequence; and an image positioning system for inserting the stored filtered input image in the field according to the determined subpixel position, for each field of each frame.

30. Apparatus as defined in claim 29, wherein said prefilter comprises means for averaging adjacent lines in the input image.

31. Apparatus as defined in claim 30, wherein said prefilter comprises a low pass filter.

32. Apparatus as defined in claim 30, wherein said prefilter comprises a nonlinear filter.

33. Apparatus as defined in claim 30, wherein said effect processing system comprises means for computing a vertical position of each line of the filtered input image in the field according to the effect; and wherein said image positioning system comprises means for computing each pixel value in a line of the field according to a function of pixel values in two adjacent lines in the filtered input image and the computed vertical position.

34. Apparatus as defined in claim 30, wherein said prefilter has an associated offset; and wherein said image positioning system comprises means for adjusting the determined subpixel position according to the effect; and means for inserting the filtered input image in each field according to the adjusted subpixel position.

35. Apparatus for generating a sequence of interlaced video frames, wherein each frame comprises two fields, from an input image according to an effect that defines at least a position of the input image in each frame, comprising:

a prefilter for filtering the input image for each field of each frame;

an effect processing system for determining, for each field of each frame, a subpixel position in the filtered input image according to the effect, a position of the field in the frame and the position of the frame in the sequence; and an image positioning system for positioning the filtered input image in the field according to the determined subpixel position, for each field of each frame.

36. Apparatus as defined in claim 35, wherein said effect processing system comprises means for computing a vertical position of each line of the filtered input image in the field according to the effect; and wherein said image positioning system comprises means for computing each pixel value in a line of the field according to a function of pixel values in two adjacent lines in the filtered input image and the computed vertical position.

37. Apparatus as defined in claim 35, wherein said prefilter has an associated offset; and wherein said image positioning system comprises means for adjusting the determined subpixel position according to the offset; and means for positioning the filtered input image in each field according to the adjusted subpixel position.

* * * * *